Nov. 25, 1930.  A. S. FERRIERA  1,782,813

MOLD

Filed July 24, 1929

INVENTOR
Angelo S. Ferriera
John A. Ohiosmith
ATTORNEY

Patented Nov. 25, 1930

1,782,813

UNITED STATES PATENT OFFICE

ANGELO S. FERRIERA, OF SAN JOSE, CALIFORNIA

MOLD

Application filed July 24, 1929. Serial No. 380,607.

This invention relates particularly to frozen confections and the like mounted upon and encompassing one end of a supporting member or stick.

It is one object of the invention to provide a food product mounted upon a supporting stick and having such a conformation as to render it readily available at different points when eaten.

It is another object of the invention to provide a simple and economical method of mounting the edible portion upon the stick.

It is still another object of the invention to provide a food product and a method of making the same, that will be economical, simple, practical and highly efficient in its practical application.

In effecting my invention I first provide a suitable mold as indicated at 1. This mold may be of any desired conformation if it is provided with means whereby a liquid or a plastic mass may be introduced into its interior and solidified into a mass of greater cross-sectional area at one end than at the other end, and then withdrawn from the mold as a single whole without mutilating its outer surfaces.

As herein disclosed the mold is open at its top, 2, and the top is larger than the bottom 3. The top and bottom are joined by the parallel and spaced sides 4 and the sloping edge portions 5, so that when a liquid is poured into the mold and frozen it may be easily drawn.

Figure 1:
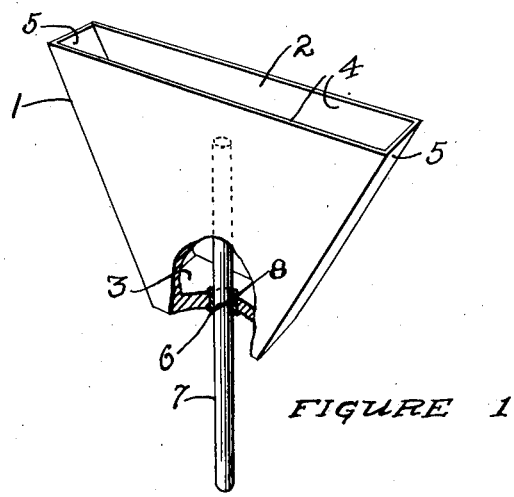
Figure 1 is a perspective illustration of a form in which the food product is molded, part broken away, and with the supporting stick in position.

Formed in the bottom of the mold and passing therethrough, is a hole 6 through which the supporting stick 7 may be passed as shown in Figure 1. In the present instance the hole is fitted with a rubber element 8 whereby to effectually prevent leakage past the stick before the liquid is frozen.

Figure 2:
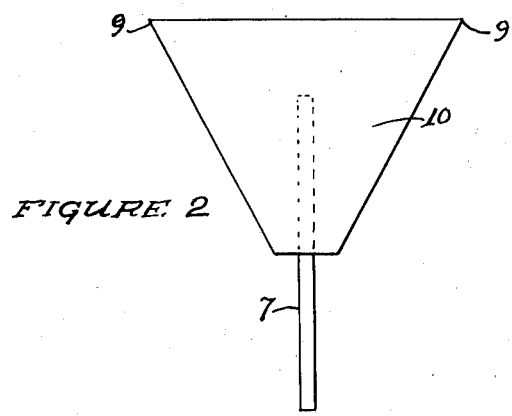
Figure 2 is a side elevation of the product as formed in the mold shown in Figure 1.

After the mass in the mold has solidified on the stick the whole may be lifted out, the resulting food product having the configuration shown in Figure 2. In this or any similar form where projecting portions are formed on the part remote from the stick, as at 9, the mold must be so formed that the edible head and the stick may be readily drawn as a whole therefrom.

Another feature of this invention is that the stick 7 forms a handle for the mold when empty and may be used as a support for the same while being filled, as well as forming a handle for the product when removed from the mold.

It is to be understood, of course, that while I have herein shown and described but one specific embodiment of my invention, changes in form, construction, and method of manufacture may be made within the scope of the appended claim.

I claim:

A mold of the character described comprising a body portion or receptacle open at one end and having inner surfaces inclined inwardly toward the other end, and means formed in the last mentioned end for releasably holding a supporting element intermediate its ends whereby a liquid or plastic mass may be solidified on the supporting element within the body portion and then the element and mass removed as a unit through the open end of the body portion.

ANGELO S. FERRIERA.